March 20, 1951 W. D. PARMENTER 2,545,895
TRACTOR WINCH
Filed April 6, 1948

INVENTOR.
WILLIAM D. PARMENTER
BY McMorrow, Berman & Davidson
ATTORNEYS

Patented Mar. 20, 1951

2,545,895

UNITED STATES PATENT OFFICE 2,545,895

TRACTOR WINCH

William Donald Parmenter, Terrace, British Columbia, Canada

Application April 6, 1948, Serial No. 19,319

1 Claim. (Cl. 254—166)

This invention relates to hoist devices, and more particularly to a winch device for use on tractors.

A main object of the invention is to provide a novel and improved winch device for use on tractors, particularly of the track laying type, which is very simple in construction, easy to operate, and efficient in performance.

A further object of the invention is to provide an improved tractor winch which is inexpensive to fabricate, rugged in construction, and providing accurate control of the movement of loads carried thereby, the winch being very powerful and being adapted for light or heavy duty service.

Further objects and advantages of the invention will become apparent from the following description and claim, and from the accompanying drawings, wherein:

Figure 1:
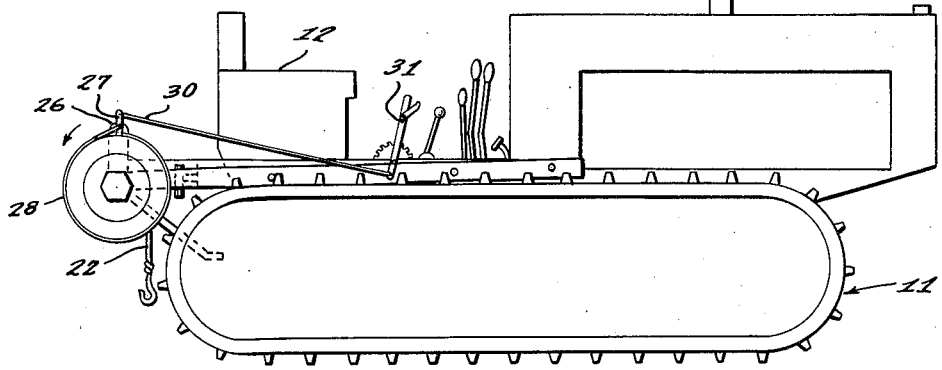
Figure 1 is a side elevational view of a tractor of the track laying type equipped with a winch device constructed in accordance with the present invention.
Figure 2:
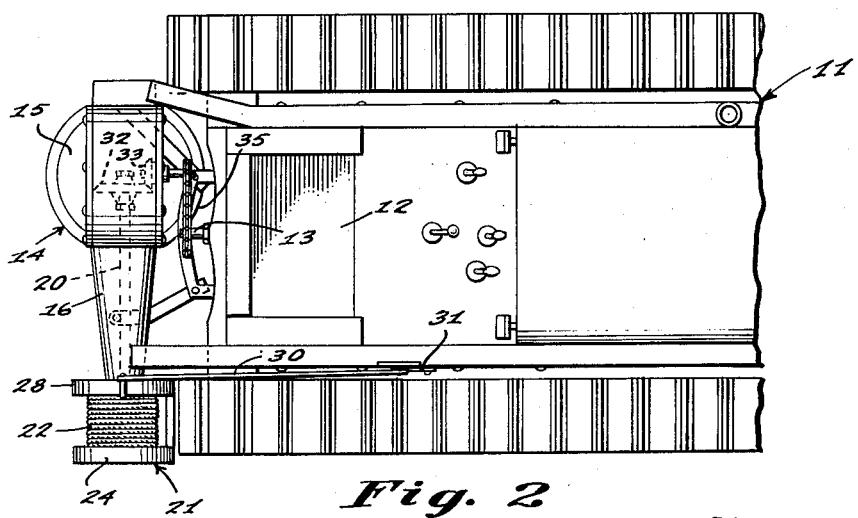
Figure 2 is a top fragmentary plan view of the tractor of Figure 1.
Figure 3:
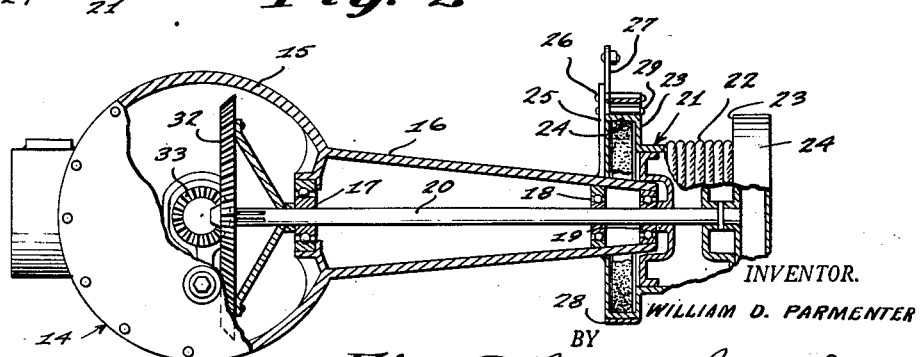
Figure 3 is an enlarged side elevational view, partly in cross-section of the winch device employed on the tractor of Figure 1.

Referring to the drawings, 11 designates a conventional tractor of the track-laying type and 12 designates the operator's seat thereof. The tractor 11 has a rearwardly projecting power take-off shaft, indicated at 13, located at the rear of the tractor frame. Secured rearwardly to said frame by suitable brackets is a housing member 14 comprising a gear housing portion 15 and a shaft housing portion 16 extending transversely of the tractor frame. Journalled in said shaft housing portion by suitable bearings such as are shown at 17, 18 and 19 is a shaft 20.

Shaft 20 projects axially from the end of housing portion 16 and secured to the projecting end of said shaft is a reel 21 carrying wound thereon a winch cable 22. Reel 21 is provided with side flanges 23, 23, each side flange being formed with an annular extension 24. Secured to housing portion 16 adjacent the inner annular extension 24 is a radially extending arm 25. Arm 25 carries adjacent its outer end a pin 26. Pivoted to said pin 26 is a lever 27. Secured to said pin adjacent lever 27 is one end of a brake band 28 which surrounds extension 24. The other end of brake band 28 is secured to a pin 29 carried by the lower end of lever 27 and extending parallel to pin 26. The top end of lever 27 is connected by a rod 30 to the lower end of a hand lever 31 pivoted to the tractor frame adjacent the operator's seat 12. Hand lever 31 is provided with conventional releasable locking means for securing it in a desired position of pivotal adjustment.

When hand lever 31 is rotated counter-clockwise, as viewed in Figure 1, lever 27 is rotated clockwise around pivot pin 26, causing the brake band 28 to be tightened on the surface of the annular extension 24 which it surrounds and applies a braking force to the reel 21.

Secured to the inner end of shaft 20 in the housing portion 15 is a relatively large bevel gear 32 which meshes with a pinion gear 33 carried on a shaft 34 journalled in the wall of said housing portion 15 facing the rear end of the tractor frame. Shaft 34 carries a sprocket wheel which is coupled to a sprocket wheel carried by power take-off shaft 13 by a sprocket chain 35.

In operation, torque is transmitted to shaft 20 through shaft 34 and the meshing bevel gears 33 and 32, causing reel 21 to revolve and winding the cable 22 thereon. When the power take-off shaft is deenergized the load may be held stationary by rotating hand lever 31 to full braking position, which locks the reel 21 by the clamping action exerted by brake band 28 on the extension 24 encircled thereby. To release the load, hand lever 31 is returned to its normal brake-releasing position.

While a specific embodiment of a winch device for use on tractors has been disclosed in the foregoing description, it will be understood that various modifications within the spirit of the invention may occur to those skilled in the art. Therefore it is intended that no limitations be placed on the invention except as defined by the scope of the appended claim.

What is claimed is:

In a tractor of the track laying caterpillar tread type, a frame, a housing secured to the rear portion of said frame and extending transversely of the tractor, said housing being located rearwardly of the caterpillar treads of the tractor and terminating adjacent the rear end of one of the caterpillar treads, a shaft member axially journaled in said housing, a cable reel secured to the outer end of the shaft member substantially in the same longitudinal vertical plane of said one of the caterpillar treads, said reel being formed with annular extensions at its peripheral side margins, a vertical upstanding arm projecting radially from said housing adjacent the inner annular extension, a pin carried by said arm overlying said inner annular extension, a lever pivoted at its intermediate portion to said pin, a brake band encircling said inner extension, one end of said brake band being secured to said pin and the other end of said band being secured to the lower end of the lever, a handle pivoted to said frame, and means connecting the handle to the upper end of said lever, whereby tension may be applied to said brake band responsive to rotation of said handle.

WILLIAM DONALD PARMENTER.

REFERENCES CITED

The following references are of record in the file of this patent:

UNITED STATES PATENTS

| Number | Name | Date |
| --- | --- | --- |
| 1,408,576 | Frantz | Mar. 7, 1922 |
| 1,491,718 | Miller | Apr. 22, 1924 |
| 2,344,795 | Weber | Mar. 21, 1944 |
| 2,411,626 | Jaques | Nov. 26, 1946 |